United States Patent
Wolfson et al.

(10) Patent No.: US 10,303,464 B1
(45) Date of Patent: May 28, 2019

(54) AUTOMATED CODE TESTING WITH TRAVERSAL OF CODE VERSION AND DATA VERSION REPOSITORIES

(71) Applicant: EMC IP Holding Company LLC, Hopkinton, MA (US)

(72) Inventors: Kfir Wolfson, Beer Sheva (IL); Amit Lieberman, Kfar Saba (IL); Jehuda Shemer, Kfar Saba (IL); Assaf Natanzon, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 62 days.

(21) Appl. No.: 15/393,636

(22) Filed: Dec. 29, 2016

(51) Int. Cl.
*G06F 8/71* (2018.01)
*G06F 11/36* (2006.01)

(52) U.S. Cl.
CPC ............ *G06F 8/71* (2013.01); *G06F 11/3664* (2013.01); *G06F 11/3688* (2013.01)

(58) Field of Classification Search
CPC .... G06F 11/3664–11/3696; G06F 8/70; G06F 8/71
USPC ................................. 717/120, 122, 124, 125
See application file for complete search history.

(56) References Cited

U.S. PATENT DOCUMENTS

| | | | |
|---|---|---|---|
| 6,772,083 B2 * | 8/2004 | Muller ................ | G06F 11/3664 702/123 |
| 7,590,973 B1 * | 9/2009 | Barry .................. | G06F 11/3688 714/38.14 |
| 8,239,757 B2 * | 8/2012 | Johnson .............. | G06F 11/3684 715/237 |
| 8,561,036 B1 * | 10/2013 | Beans .................. | G06F 11/368 717/124 |
| 8,826,068 B2 * | 9/2014 | Somendra ........... | G06F 11/3688 714/15 |
| 9,135,149 B2 * | 9/2015 | Perin ................... | G06F 11/3688 |
| 9,411,710 B2 * | 8/2016 | Kumar ................ | G06F 11/3676 |
| 9,558,465 B1 * | 1/2017 | Arguelles ........... | G06Q 10/0639 |

(Continued)

OTHER PUBLICATIONS

Farzat, F., et al., Unit Test Case Selection to Evaluate Changes in Critical Time, INFOR, vol. 50, No. 4, Nov. 2012, pp. 163-174, [retrieved on Jan. 25, 2019], Retrieved from the Internet: <URL:https://search.proquest.com/docview/1461991518?pq-origsite=360link&accountid=14753>.*

(Continued)

*Primary Examiner* — Geoffrey R St Leger
(74) *Attorney, Agent, or Firm* — Ryan, Mason & Lewis, LLP

(57) ABSTRACT

An apparatus in one embodiment comprises at least one processing platform including a plurality of processing devices. The processing platform implements compute services for users and further comprises a copy data manager configured to maintain a data version repository. The data version repository stores under the control of the copy data manager multiple data versions for each of one or more of the compute services implemented by the processing platform. A code version repository stores multiple code versions for each of one or more of the compute services. Automated testing of one or more of the code versions for a given one of the compute services and one or more of the data versions for the given compute service is carried out by an automated code testing system applying a search algorithm to traverse both the one or more code versions and the one or more data versions.

20 Claims, 7 Drawing Sheets

(56) References Cited

U.S. PATENT DOCUMENTS

| | | | | |
|---|---|---|---|---|
| 2001/0012986 A1* | 8/2001 | Conan | G06F 11/3688 | 702/188 |
| 2004/0044494 A1* | 3/2004 | Muller | G06F 11/3664 | 702/123 |
| 2009/0164941 A1* | 6/2009 | Johnson | G06F 11/3684 | 715/810 |
| 2010/0083230 A1* | 4/2010 | Ramakrishnan | G06F 8/71 | 717/121 |
| 2012/0260344 A1* | 10/2012 | Maor | G06F 11/3688 | 726/25 |
| 2013/0132774 A1* | 5/2013 | Somendra | G06F 11/3688 | 714/32 |
| 2013/0179734 A1* | 7/2013 | Perin | G06F 11/3688 | 714/32 |
| 2014/0108339 A1* | 4/2014 | Marsden | G06F 16/214 | 707/611 |
| 2014/0372983 A1* | 12/2014 | Presley | G06F 11/368 | 717/124 |
| 2016/0034382 A1* | 2/2016 | Kumar | G06F 11/3676 | 717/124 |
| 2016/0110188 A1* | 4/2016 | Verde | G06F 11/2007 | 709/227 |
| 2016/0179509 A1* | 6/2016 | Raghavan | G06F 8/71 | 717/121 |
| 2016/0239295 A1* | 8/2016 | Kolesnik | G06F 8/71 | |

OTHER PUBLICATIONS

Beszeédes, A., et al., Code Coverage-Based Regression Test Selection and Prioritization in WebKit, 28th IEEE International Conference on Software Maintenance (ICSM), 2012, pp. 46-55, [retrieved on Jan. 25, 2019], Retrieved from the Internet: <URL:http://ieeexplore.ieee.org/>.*

U.S. Appl. No. 14/978,351 filed in the name of A. Natanzon et al. on Dec. 22, 2015 and entitled "Storing Application Data as an Enhanced Copy."

* cited by examiner

DATA VERSION POINT-IN-TIME (PIT) COPIES STORED IN ASSOCIATION
WITH RESPECTIVE SETS OF RECORDED INCOMING TRAFFIC

| | |
|---|---|
| APP1 DATA VERSION PIT COPY T1 | APP1 RECORDED TRAFFIC T1 |
| APP1 DATA VERSION PIT COPY T2 | APP1 RECORDED TRAFFIC T2 |
| ... | ... |
| APP2 DATA VERSION PIT COPY T3 | APP2 RECORDED TRAFFIC T3 |
| APP2 DATA VERSION PIT COPY T4 | APP2 RECORDED TRAFFIC T4 |
| ... | ... |
| APPX DATA VERSION PIT COPY TY | APPX RECORDED TRAFFIC TY |

FIG. 5

AUTOMATED CODE TESTING WITH TRAVERSAL OF CODE VERSION AND DATA VERSION REPOSITORIES

FIELD

The field relates generally to information processing systems, and more particularly to code testing in information processing systems.

BACKGROUND

A wide variety of different techniques for testing software code are known. These conventional code testing techniques have significant drawbacks, particularly when utilized to test application code for applications executed in virtual machines, containers and other compute resources of cloud infrastructure. For example, the application code is typically tested using prefabricated or otherwise static test data. Such an arrangement is problematic in that various bugs, weaknesses or other types of failures in the application code may not be exposed until after the application code is deployed and executed in the cloud infrastructure using dynamically-varying data.

SUMMARY

In one embodiment, an apparatus comprises at least one processing platform including a plurality of processing devices. In this embodiment, the processing platform implements compute services for users and further comprises a copy data manager configured to maintain a data version repository. The data version repository is configured to store under the control of the copy data manager a plurality of data versions for each of one or more of the compute services implemented by the processing platform. Also associated with processing platform is a code version repository that is configured to store a plurality of code versions for each of one or more of the compute services implemented by the processing platform. Automated testing of one or more of the code versions for a given one of the compute services and one or more of the data versions for the given compute service is carried out by an automated code testing system applying a search algorithm to traverse both the one or more code versions and the one or more data versions.

Other illustrative embodiments include, without limitation, apparatus, systems, methods and computer program products comprising processor-readable storage media.

BRIEF DESCRIPTION OF THE DRAWINGS

FIG. 5 shows an example of storage of point-in-time copies of application data in association with respective sets of recorded incoming traffic for use in automated code upgrade testing in an illustrative embodiment of the present disclosure.

DETAILED DESCRIPTION

Illustrative embodiments of the present disclosure will be described herein with reference to exemplary information processing systems and associated computers, servers, storage devices and other processing devices. It is to be appreciated, however, that embodiments of the disclosure are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. In many embodiments, an information processing system may therefore comprise, for example, at least one data center that includes one or more clouds hosting multiple tenants that share cloud resources. Numerous other types of enterprise and cloud-based computing and storage systems are also encompassed by the term "information processing system" as that term is broadly used herein.

Some illustrative embodiments of the present disclosure provide information processing systems that implement automated code testing utilizing a search algorithm to traverse multiple code versions and multiple data versions. Such arrangements can provide significantly improved detection and analysis of bugs, weaknesses or other types of failures through search algorithm traversal of multiple code and data versions. In certain embodiments, the code and data version traversal is performed at least in part in part in conjunction with what is referred to herein as "continuous data refresh" or CDR for improved automated testing of one or more code versions of applications executed by a given compute service. In other embodiments, the code and data version traversal is performed at least in part in conjunction with what is referred to herein as "non-disruptive" live upgrade testing of one or more code versions of applications executed by the given compute service.

In many embodiments, compute services are provided for users under a platform-as-a-service (PaaS) model, although it is to be appreciated that numerous other cloud infrastructure arrangements could be used.

Advantageously, one or more embodiments provide significantly improved test coverage for multiple code versions of one or more applications executed as respective compute services in cloud infrastructure. As a result, in certain embodiments, application code can be made more robust to failures that might otherwise occur when code versions are executed using data versions that differ from static test data.

Figure 1:
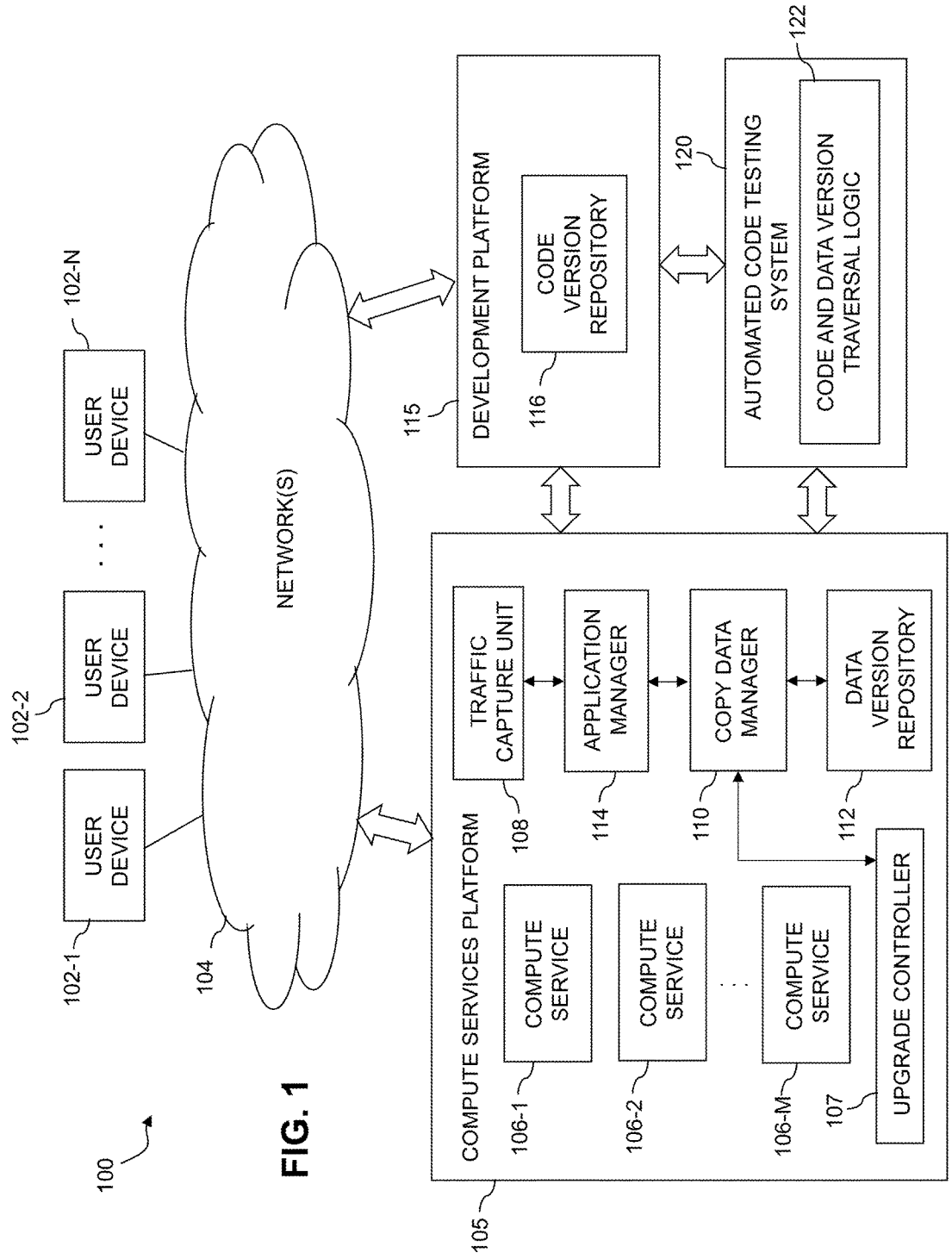
FIG. 1 is a block diagram of an information processing system implementing automated code testing with traversal of code version and data version repositories in an illustrative embodiment of the present disclosure.

The example embodiment of FIG. 1 shows an information processing system 100 configured in accordance with an illustrative embodiment of the present disclosure. The information processing system 100 comprises user devices 102-1, 102-2, . . . 102-N. The user devices 102 communicate over a network 104 with a compute services platform 105.

The user devices 102 can comprise, for example, desktop, laptop or tablet computers, mobile telephones, or other types of processing devices capable of communicating with the compute services platform 105 over the network 104.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using IP or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Referring again to FIG. 1, the compute services platform 105 in some embodiments may be implemented as part of cloud infrastructure in the form of a cloud-based system such as an Amazon Web Services (AWS) system. Other examples of cloud-based systems that can be used to provide at least portions of the compute services platform 105 and possibly other portions of system 100 include Google Cloud Platform (GCP) and Microsoft Azure.

The compute services platform 105 in the embodiment of FIG. 1 illustratively implements compute services 106-1, 106-2, . . . 106-M on behalf of respective cloud infrastructure tenants each corresponding to one or more users associated with respective ones of the user devices 102. The variables N and M are arbitrary positive integers greater than or equal to one. The compute services 106 are assumed to include execution of one or more applications on behalf of each of one or more users associated with respective user devices 102. A given such application illustratively includes one or more code versions and one or more data versions. The data versions include application data utilized in execution of the corresponding application within a given one of the compute services 106.

The "users" in this embodiment may refer, for example, to respective ones of the user devices 102, although the term "user" as utilized herein is intended to be broadly construed so as to encompass numerous other arrangements of human, hardware, software or firmware entities, as well as combinations of such entities.

As indicated above, the compute services 106 in some embodiments are provided to users in accordance with a PaaS model, although compute services can be provided using other techniques in other embodiments.

The compute services platform 105 in the FIG. 1 embodiment and other processing platforms referred to herein are assumed to be implemented using one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The compute services platform 105 in the FIG. 1 embodiment illustratively comprises an upgrade controller 107 and a traffic capture unit 108. The upgrade controller 107 and traffic capture unit 108 in this embodiment are assumed to be implemented on the same processing platform that provides compute services 106, but in other embodiments one or both of the upgrade controller 107 and the traffic capture unit 108 can be implemented at least in part externally to that processing platform, such as in a separate external device or platform.

The compute services platform 105 in the FIG. 1 embodiment further comprises a copy data manager 110 configured to maintain a data version repository 112. The copy data manager 110 also interacts with an application manager 114. The application manager 114 controls execution of applications as part of the compute services 106. The application manager 114 illustratively receives application code from a development platform 115 that includes a code version repository 116. It should be noted that "receives" in this context is intended to be broadly construed so as to encompass, for example, push arrangements, pull arrangements or other techniques that allow the application manager 114 to obtain application code from the code version repository 116.

The application manager 114 also interacts with the traffic capture unit 108 to control the recording of incoming traffic received by at least a subset of the applications of the compute services 106.

The data version repository 112 is configured to store under the control of the copy data manager 110 a plurality of data versions for each of one or more of the compute services 106 implemented by the compute services platform 105.

The data versions stored for a particular one of the compute services 106 in some embodiments include data versions associated with respective distinct database schema of one or more databases utilized by that compute service. Use of such data versions in automated live upgrade testing helps to ensure that corresponding code version upgrades are tested using data versions having the appropriate database schema rather than predefined and potentially obsolete database schema.

The code version repository 116 is configured to store a plurality of code versions for each of one or more of the compute services 106 implemented by the compute services platform 105. The code versions are illustratively associated with respective applications for which execution is controlled by the application manager 114. In some embodiments, the code version repository 116 comprises a code version control repository associated with a code development system. An example of a code version control repository that may be used in some embodiments is the "git" version control repository. Alternatively, in other embodiments, the code version repository 116 can be implemented within the compute services platform 105.

In the FIG. 1 embodiment, automated testing of one or more of the code versions for a given one of the compute services and one or more of the data versions for the given compute service is carried out by an automated code testing system 120 applying a search algorithm to traverse both the one or more code versions and the one or more data versions. The search algorithm may comprise a binary search algorithm that includes at least one of a code version bisection algorithm and a data version bisection algorithm, although a wide variety of other search algorithms can be used in other embodiments.

The search algorithm in some embodiments may be configured to permit specification of at least one of a start code version and a stop code version for an application of the given compute service and at least one of a start data version and a stop data version for the application of the given compute service.

The automated code testing system 120 of the FIG. 1 embodiment may be configured to automatically determine one or more Boolean result criteria for the search algorithm.

The automated testing performed by the automated code testing system 120 illustratively comprises utilizing a plurality of one-dimensional test planes which vary as a function of production time. Each of the one-dimensional test planes comprises for a corresponding production time at least one point corresponding to a particular one of the code versions and at least one point corresponding to a particular one of the data versions. An example of such an arrangement is described in more detail below in conjunction with FIG. 3. The automated code testing system 120 applies the search algorithm to traverse through particular code and data versions for testing from at least portions of one or more of the one-dimensional test planes. This functionality is implemented by code and data version traversal logic 122 of the automated code testing system 120.

Additionally or alternatively, the code versions stored in the code version repository 116 and the data versions stored in the data version repository 112 of the FIG. 1 embodiment collectively provide a two-dimensional test plane utilized by automated code testing system 120 to test one or more of the code versions. More particularly, automated testing of at least one of the code versions is carried out by the automated code testing system 120 using multiple distinct ones of the data versions selected from the two-dimensional test plane. An example of a two-dimensional test plane of this type will be described in more detail below in conjunction with FIG. 4. The automated code testing system 120 selects particular code and data versions for testing from respective corresponding points in the two-dimensional test plane. This functionality is implemented by code and data version selection logic that is illustratively part of the code and data version traversal logic 122 of the automated code testing system 120.

Examples of selection techniques that may be applied by code and data version selection logic of the code and data version traversal logic 122 include random selection, arbitrary selection, round-robin selection, revenue-based selection and issue-based selection.

Illustrative embodiments implementing the above-described selection of particular code and data versions from respective corresponding points in a two-dimensional test plane may be viewed as providing at least portions of the previously-mentioned "continuous data refresh" or CDR functionality for improved automated testing of one or more code versions of applications executed by the given compute service.

As another example, one or more of the data versions of the data version repository 112 are stored by the copy data manager 110 of the FIG. 1 embodiment in association with respective sets of recorded incoming traffic of the corresponding compute service. The sets of incoming traffic in the FIG. 1 embodiment are assumed to be captured by the traffic capture unit 108. The incoming traffic illustratively comprises Hypertext Transfer Protocol (HTTP) data traffic, although a wide variety of other types of incoming traffic can be recorded, as well as combinations of multiple distinct traffic types, depending on the particular type of application for which it is received.

The "recording" of the incoming traffic illustratively refers to capture of the incoming traffic by the traffic capture unit 108 or storage of the incoming traffic itself or information derived therefrom by the copy data manager 110 in the data version repository 112 or a separate incoming traffic repository.

For example, a given one of the one or more data versions illustratively provides a point-in-time copy of application data utilized by an application of the corresponding compute service. The set of recorded incoming traffic stored in association with the given data version characterizes a traffic workload processed by the application of the corresponding compute service utilizing the application data.

The upgrade controller 107 is configured to upgrade at least a portion of the application from a first code version to a second code version. The upgrade in the FIG. 1 embodiment is more particularly assumed to be a live upgrade, although code testing can be performed for other types of upgrades in other embodiments.

The set of recorded incoming traffic stored in association with the given data version in some embodiments comprises incoming traffic recorded for a period of time that is determined based at least in part on an expected amount of time required to perform the live upgrade of at least a portion of the application from the first code version to the second code version. Other techniques can be used to determine the period of time for which incoming traffic should be recorded.

For example, in some embodiments, the period of time for which incoming traffic is recorded includes an expected amount of time for carrying out pre-upgrade functions such as disabling, regulating or otherwise delaying non-critical services. The non-critical services can include sending batch emails or performing maintenance for the particular compute service application that is being upgraded. Also, the period of time for which incoming traffic is recorded can additionally or alternatively include an expected amount of time for carrying out post-upgrade functions such as restoring state, stabilizing the system and returning to normal production patterns.

In conjunction with the upgrade of at least a portion of the application from the first code version to the second code version, automated testing of the upgraded application is carried out by an automated code testing system 120 using the given data version and its associated set of recorded incoming traffic. Such testing is more particularly controlled by live upgrade testing logic that is illustratively part of the code and data version traversal logic 122 of the automated code testing system 120. The testing may be carried out at least in part prior to the upgrade, subsequent to the upgrade or as the upgrade is taking place. For example, an application comprising multiple parts each of which is subject to live upgrade may be tested in stages as each individual part is upgraded.

The automated testing of the upgraded application using the given data version and its associated set of recorded incoming traffic illustratively comprises executing the upgraded application utilizing the point-in-time copy of the application data and in conjunction with executing the upgraded application, replaying the associated set of recorded incoming traffic for processing by the upgraded application. The automated testing of the upgraded application may further comprise repeating the execution and replay for each of one or more additional data versions and respective associated sets of recorded incoming traffic of the corresponding compute service.

In some embodiments, the automated testing comprises testing the performance of at least portions of the application before, during and after the upgrade. For example, such performance testing can be performed to detect any degradations or improvements in the functionality of the application that might arise in conjunction with the upgrade. Moreover, performance testing can be used to determine the manner in which particular traffic patterns negatively or positively impact the operation of the application. These and other types of performance testing can be carried out under the control of the live upgrade testing logic that is part of the code and data version traversal logic 122.

Additionally or alternatively, the upgrade controller 107 may be configured to retrieve code versions from the code version repository 116. For example, the code and data version traversal logic 122 can direct the testing of a particular upgraded application and responsive to a successful test can instruct the upgrade controller 107 to obtain the appropriate corresponding code version or code versions from the code version repository 116.

Illustrative embodiments implementing the above-described automated testing using a given data version and its associated set of recorded incoming traffic may be viewed as providing at least portions of the previously-mentioned "non-disruptive" live upgrade testing of an application executed by a compute service.

In some embodiments, the compute services platform 105, the development platform 115 and the automated code testing system 120 are implemented on respective distinct processing platforms. Numerous other arrangements are possible. For example, in some embodiments at least portions of at least one of the development platform 115 and the automated code testing system 120 are also implemented on the compute services platform 105.

In the FIG. 1 embodiment, the data version and code version repositories 112 and 116 are assumed to be implemented utilizing one or more storage systems of their corresponding processing platform(s).

Such storage systems can comprise any of a variety of different types of storage including network-attached storage (NAS), storage area networks (SANs), direct-attached storage (DAS) and distributed DAS, as well as combinations of these and other storage types, including software-defined storage.

In some embodiments, the data version repository 112 is more particularly implemented utilizing a Data Domain® system from Dell EMC of Hopkinton, Mass. A Data Domain® system provides secondary storage optimized as a backup target for multiple copies, and is therefore well suited for use as data version repository 112.

Other particular types of storage products that can be used in implementing a given storage system in an illustrative embodiment include VNX® and Symmetrix VMAX® storage arrays, software-defined storage products such as ScaleIO™ and ViPR®, flash-based storage arrays such as DSSD™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators in the S-Series, X-Series and NL-Series product lines, all from Dell EMC. Combinations of multiple ones of these and other storage products can also be used in implementing a given storage system in an illustrative embodiment.

The term "processing platform" as used herein is intended to be broadly construed so as to encompass, by way of illustration and without limitation, multiple sets of processing devices and associated storage systems that are configured to communicate over one or more networks. For example, distributed implementations of the compute services platform 105 are possible, in which certain components of the platform reside in one data center in a first geographic location while other components of the platform reside in one or more other data centers in one or more other geographic locations that are potentially remote from the first geographic location. Thus, it is possible in some implementations of the system 100 for the data version repository 112 to reside in a different data center than the copy data manager 110 and other platform components. Numerous other distributed implementations of the compute services platform 105 are possible. One or both of the development platform 115 and the automated code testing system 120 can also be implemented in a distributed manner.

The copy data manager 110 in the FIG. 1 embodiment is configured to control storage of at least a subset of the data versions for a given one of the compute services 106 in the data version repository 112 as respective point-in-time backup or replication copies of application data utilized by that compute service. Additionally or alternatively, the copy data manager 110 is configured to control storage of at least a subset of the data versions for a given one of the compute services 106 in the data version repository as respective instances of live application data utilized by that compute service.

In some embodiments, one or more of the data versions comprise respective metacopies of data utilized by a corresponding one of the compute services 106. A metacopy illustratively comprises a copy of one or more copies.

The copy data manager 110 in the FIG. 1 embodiment is assumed to be fully integrated with the compute services functionality of the compute services platform 105. More particularly, the copy data manager performs copy management functions such as backup and restore for the application data utilized by the compute services 106. These functions of the copy data manager 110 are illustratively orchestrated in conjunction with orchestration of the compute services 106 by the application manager 114.

For example, illustrative embodiments can utilize copy data management functionality of the type disclosed in U.S. patent application Ser. No. 14/978,351, filed Dec. 22, 2015 and entitled "Storing Application Data as an Enhanced Copy," which is incorporated by reference herein.

In some embodiments, the code and data version traversal logic 122 of the automated code testing system 120 is implemented in the form of one or more automated quality assurance software "bots" that are configured for automatic selection of data versions, code versions and sets of recorded incoming traffic for use in automated testing.

The code and data version traversal logic 122 therefore implements a strategy for selection between multiple code versions and multiple data versions for testing a given application executed by one of the compute services 106.

In some embodiments, the copy data manager 110 is configured to transfer one or more data versions selected for use in automated testing from the data version repository 112 to the automated code testing system 120. Such transfer may additionally include the one or more corresponding sets of recorded incoming traffic associated with the one or more selected data versions. The automated code testing system 120 illustratively retrieves the code versions from the code version repository 116. This operation may occur responsive to instructions received from the upgrade controller 107.

Although illustratively shown as a separate component in this embodiment, the automated code testing system 120 in other embodiments can be implemented at least in part within the compute services platform 105 or within another system component such as the development platform 115.

It is to be appreciated that these and other features of illustrative embodiments are presented by way of example only, and should not be construed as limiting in any way.

Accordingly, different numbers, types and arrangements of system components such as compute services 106, upgrade controller 107, traffic capture unit 108, copy data manager 110, application manager 114, data version and code version repositories 112 and 116, and automated code testing system 120 can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

The operation of the information processing system 100 will now be described in further detail with reference to the flow diagram of the example embodiment of FIG. 2. The process as shown includes steps 200 through 206, and is suitable for use in the system 100 but is more generally applicable to other types of systems comprising a compute services platform, a copy data manager and an automated code testing system.

In step 200, compute services are implemented for users of an information processing system. Such compute services illustratively comprise PaaS compute services that involve execution of applications on behalf of users. Numerous other types of compute services can be implemented in other embodiments.

In step 202, multiple data versions are stored for each of one or more of the compute services. As indicated previously, the data versions for a given one of the compute services illustratively comprise respective point-in-time backup or replication copies of application data utilized by that compute service. Other ones of the data versions for the given compute service comprise respective live instances of application data utilized by that compute service. Accordingly, in some embodiments, one or more of the data versions utilized in automated testing of code versions may comprise respective sets of live application data associated with an executing application of a given one of the compute services. These and other types of application data can be included in a given set of data versions stored in a data version repository under the control of a copy data manager.

In some embodiments, multiple data versions are stored for an application of a given one of the compute services in association with respective sets of recorded incoming traffic of that compute service.

In some embodiments, the set of recorded incoming traffic stored in association with a given one of the data versions may illustratively characterize a traffic workload processed by the application of the corresponding compute service utilizing the application data.

In certain embodiments, the incoming traffic may vary depending upon the type of application being executed by the given compute service. For example, if the application is configured to store information on behalf of system users, the incoming traffic may comprise the particular information that the system users have requested the application to store on their behalf. As another example, if the application is an online vehicle traffic map, the incoming traffic may comprise sets of raw data regarding vehicle location, direction and speed. In further embodiments, numerous other types of incoming traffic may be recorded in association with one or more data versions of an application in other embodiments. The term "incoming traffic" as used herein is therefore intended to be broadly construed.

The recording of incoming traffic for a given application is performed in some embodiments by a dedicated software element configured to receive all incoming traffic the application receives. Such a software element is illustratively implemented by the traffic capture unit 108 in the FIG. 1 embodiment. Other recording mechanisms can be used. It should also be noted that in most embodiments the term "recording" as used herein is intended to be broadly construed so as to encompass arrangements in which information extracted from incoming traffic is stored in place of or in addition to the traffic itself.

In some embodiments, recording of each item of the incoming traffic also includes recording a timestamp or other similar timing information characterizing the receipt of that item by the application. In many embodiments, subsequent playback of the recorded incoming traffic in conjunction with automated testing of an upgraded application can utilize such timing information to enforce proper differential timing between the received traffic items. In many embodiments, this differential timing enforcement is configured to ensure that peaks and other characteristics of actual real-world incoming traffic patterns are accurately reproduced.

Figure 2:
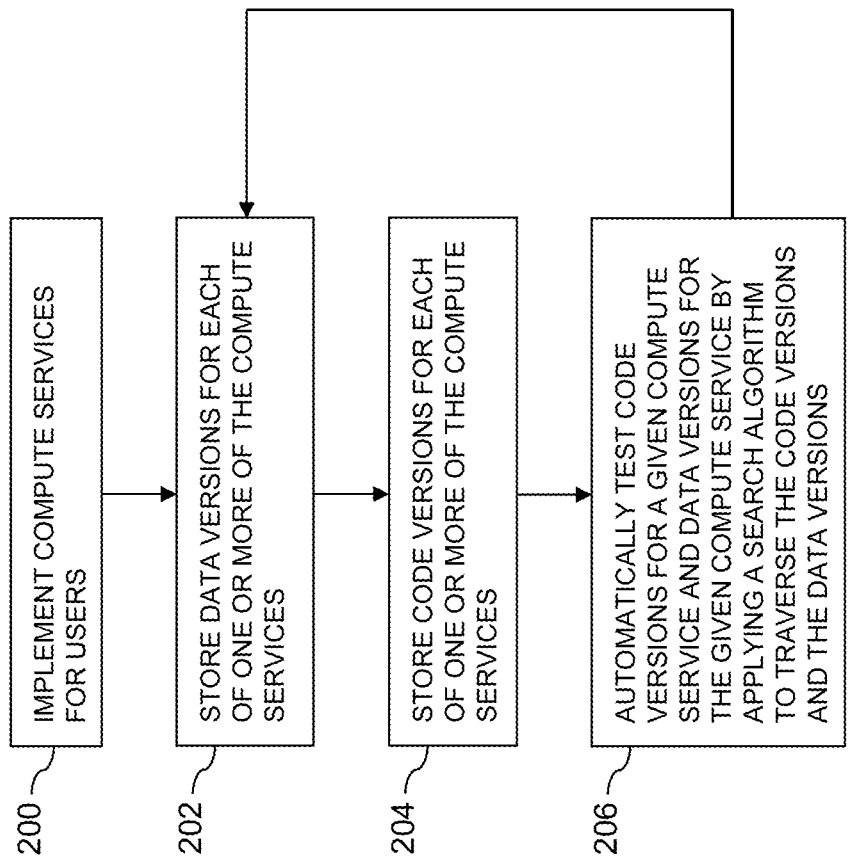
FIG. 2 is a flow diagram of a process for automated code testing with traversal of code version and data version repositories in an illustrative embodiment of the present disclosure.

In step 204 of the FIG. 2 embodiment, multiple code versions are stored for each of one or more of the compute services. The code versions in some embodiments are obtained from a code version control repository associated with a development platform or other type of code development system. Additionally or alternatively, the code versions can be maintained in a code version repository of a compute services platform or automated code testing system.

Although steps 202 and 204 of the FIG. 2 embodiment are shown in the figure as being performed serially, this is for simplicity of illustration only, and in other embodiments these steps can be performed concurrently and substantially continuously within a given information processing system.

In step 206, one or more of the code versions for a given one of the compute services and one or more of the data versions for the given compute service are automatically tested by applying a search algorithm to traverse both the one or more code versions and the one or more data versions.

For example, the search algorithm may be configured to permit specification of at least one of a start code version and a stop code version for an application of the given compute service and at least one of a start data version and a stop data version for the application of the given compute service. In such an arrangement, the search algorithm may be configured to start with the specified start code and data versions and continue through the search space based on the result from each iteration.

The search algorithm applied in step 206 of the FIG. 2 process may comprise a binary search algorithm. Such a binary search algorithm may more particularly comprise at least one of a code version bisection algorithm and a data version bisection algorithm. Numerous other alternative search algorithms may be used.

In many embodiments, selection of the search algorithm may be based at least in part on characteristics of the code and data version repositories. For example, the use of a binary search algorithm may be appropriate for multiple code and data versions involving respective single issue points in a linear progression. However, in other embodiments alternative search algorithms may be applied in which there are multiple issue points or if the progression is not linear. Such conditions can arise, for example, in some embodiments, when a given code version repository is created by merging multiple distinct code version repositories without linearization at merge.

The search algorithms used in some embodiments are configured to search linearly or randomly through the code and data versions. In certain embodiments, search algorithms based on random search may be more particularly configured to perform random seeding and descent, in which the algorithm starts at random locations and continues from a given such random location until a problem is located and then searches locally to find the starting point of the problem.

Other examples of search algorithms that may be applied include parallel search algorithms and evolutionary search algorithms. Such algorithms can provide efficient searching of a wide search area and may be viewed as part of a broader family of search algorithms known as "optimization algorithms" that are used to search a wide problem field for maxima or minima. In addition to the above-noted evolutionary algorithms, other optimization algorithms capable of discretization can be applied as search algorithms for traversal of code and data versions in illustratively embodiments.

Referring back to the illustrative embodiment of FIG. 2, an automated code testing system implementing step 206 of the FIG. 2 process may be configured to automatically determine one or more Boolean result criteria for the search algorithm. Such criteria in some embodiments can vary depending upon the fault type. For example, the search algorithm can continue traversal of a particular path until the compute service or some portion thereof crashes or otherwise stops responding.

In many embodiments, other result criteria for controlling the operation of the search algorithm can involve detecting the presence of a specific output, event or log that should not be present, or detecting the absence of a specific output, event or log that should be present.

Additional examples include performance-based or time-based thresholds, possibly relating to the speed of the compute service, or thresholds relating to the processor, memory or network resources consumed by the compute service. In further embodiments, a wide variety of additional or alternative result criteria can be used in implementing the search algorithm.

A more particular example of the operation of a search algorithm in the context of the automated testing of step 206 will now be described. In this example, it is assumed that the objective of the search algorithm is to find a particular issue in the code and data version space, namely, a specific bug occurring in that space. The finding of the bug is therefore the result criteria of the search algorithm in this example. It is further assumed that the specific bug is associated with a detectable event that should not be present, but it is unknown how that bug is triggered and how it entered the system.

The search algorithm in this example is configured to reproduce the particular issue, and to find the first instance of code version and/or data version where this issue occurs. For example, the search algorithm can produce as its result a specific code commit and/or data change commit associated with the initial appearance of the issue. Accordingly, at least one of a particular code version and a particular data version are identified as being associated with the issue where the immediately prior code and/or data versions were not associated with the issue. Such an arrangement advantageously avoids the need for costly and time-consuming manual debugging by a developer. Instead, the developer is automatically directed to a particular change in code version and/or data version that first produced the issue. Similar search-based automated testing arrangements can be used to identify a particular code version and/or data version in which a specified issue first stopped occurring, as in the case of deployment of one or more updated code versions intended to fix a specific bug.

In some embodiments, the automated testing applied in step 206 of the FIG. 2 process comprises utilizing a plurality of one-dimensional test planes which vary as a function of production time. Each of the one-dimensional test planes comprises for a corresponding production time at least one point corresponding to a particular one of the code versions and at least one point corresponding to a particular one of the data versions.

Figure 3:
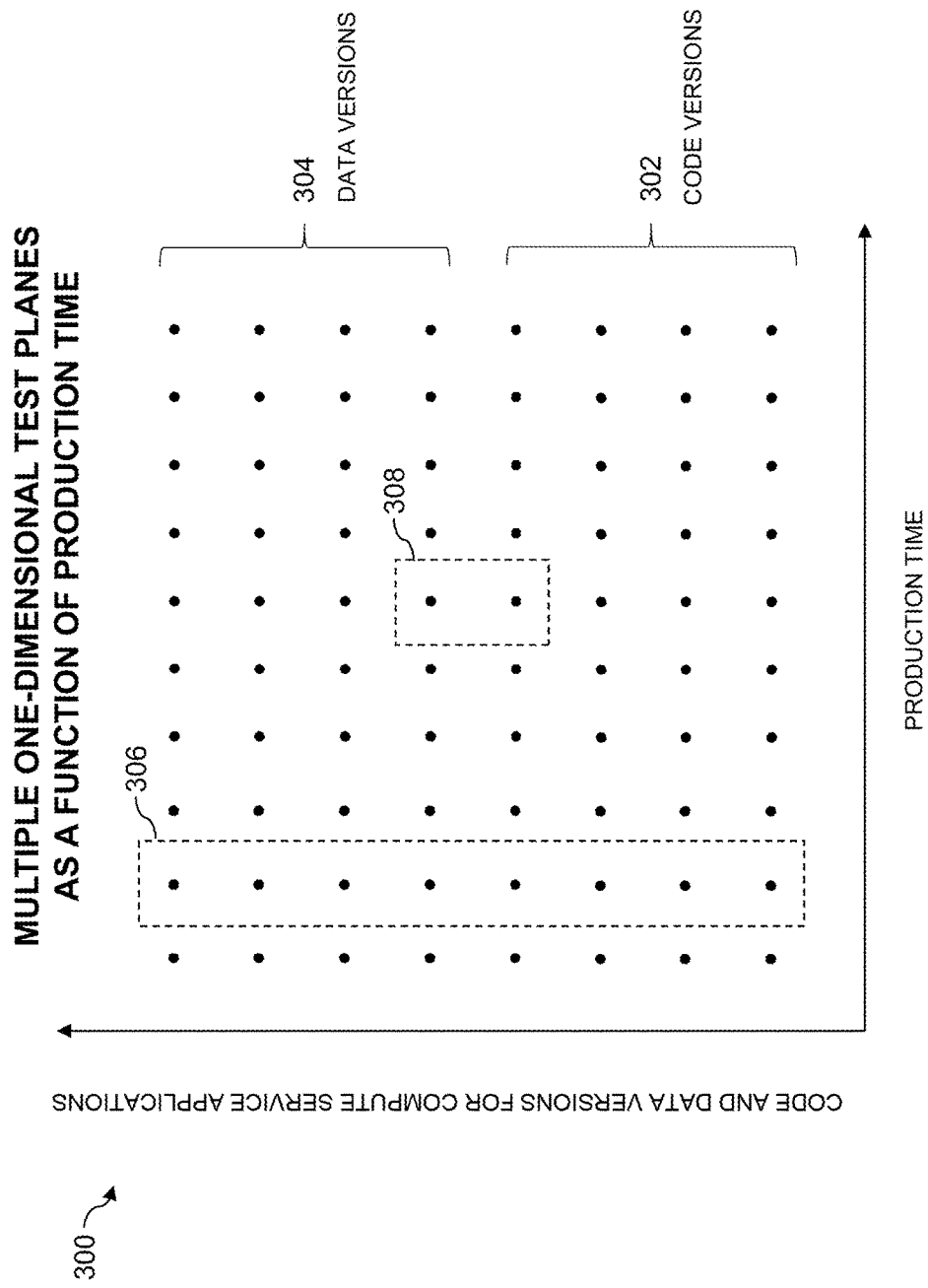
FIG. 3 shows an example of a set of multiple one-dimensional test planes utilized in automated code testing with traversal of code version and data version repositories in an illustrative embodiment of the present disclosure.

An example of a set of multiple one-dimensional test planes 300 which vary as a function of production time is shown in the illustrative embodiment of FIG. 3. In this example, a first axis of the set of multiple one-dimensional test planes 300 corresponds to code versions 302 and data versions 304 for a plurality of different compute service applications, and a second axis of the set of multiple one-dimensional test planes 300 corresponds to production time for those compute service applications.

A particular one-dimensional test plane 306 within the set of multiple one-dimensional test planes 300 comprises multiple ones of the code versions 302 and multiple ones of the data versions 304 for one or more of the compute service applications.

The automated testing of step 206 may comprise, for example, traversing the multiple code versions and multiple data versions of the one-dimensional test plane 306. Additional portions of one or more of the other test planes may be traversed in a similar manner. An example of an additional portion is portion 308 which include a single one of the code versions 302 and a single one of the data versions 304. Numerous other combinations of one-dimensional test planes or portions thereof are possible.

In traversing the code and data versions in the FIG. 3 embodiment, the search algorithm may traverse the production time axis using different code and data versions for different production times along that axis. It is also possible to traverse code and data versions separately. For example, a particular code version could be selected and multiple data versions traversed for that code version. Such an arrangement can determine how the behavior of the code version varies over time with changes in the data version. Similarly, a particular data version could be selected and multiple code versions traversed for that data version.

Additionally or alternatively, at least one of the code versions is automatically tested using multiple distinct ones of the data versions selected from a two-dimensional test plane collectively provided by the code versions and the data versions.

For example, multiple code versions can be tested in some embodiments by traversing a path through at least a portion of the two-dimensional test plane. For each of a plurality of points in the path, a corresponding one of the code versions is tested utilizing a corresponding one of the data versions.

Figure 4:
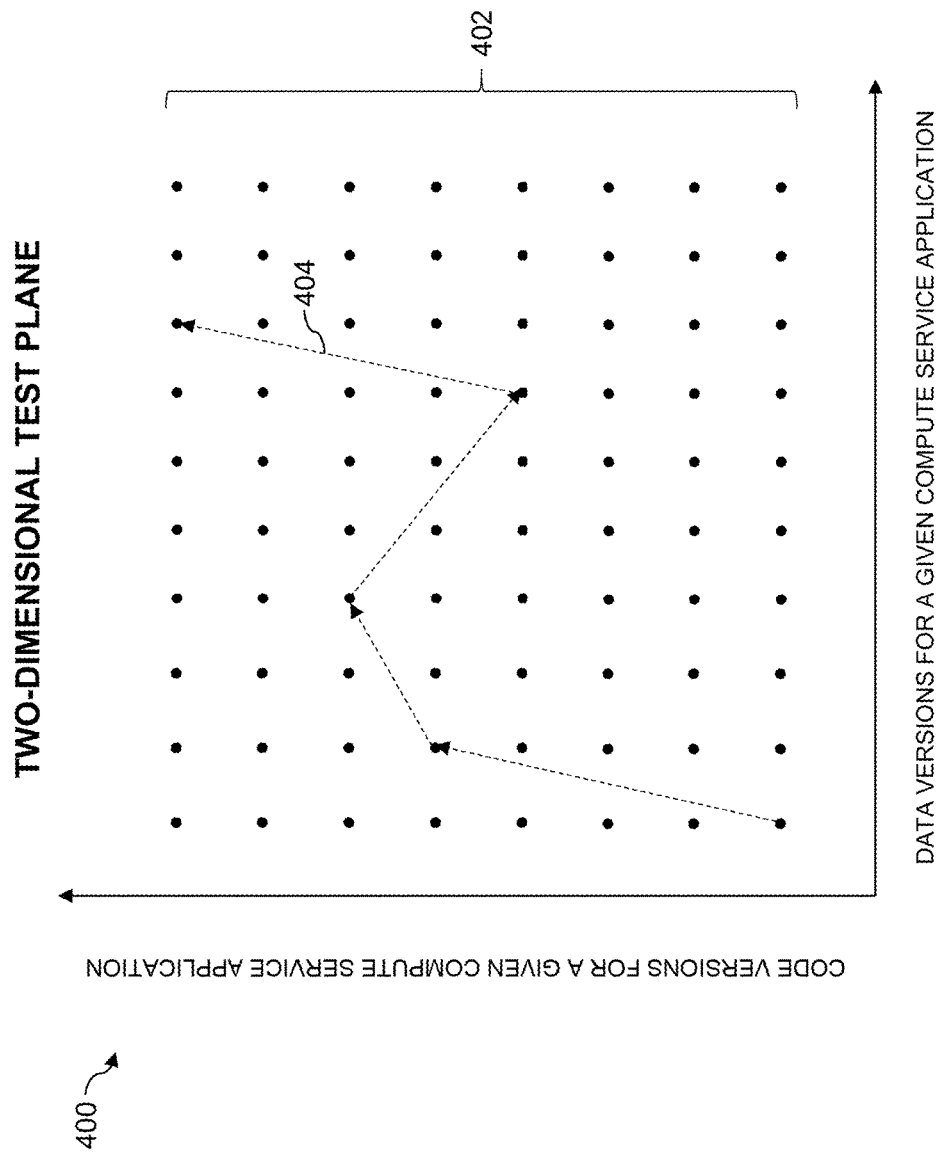
FIG. 4 shows an example of a two-dimensional test plane utilized in automated code testing with traversal of code version and data version repositories in an illustrative embodiment of the present disclosure.

An example of a two-dimensional test plane 400 utilized in automated code testing utilizing multiple data versions is shown in the illustrative embodiment of FIG. 4. In this example, a first axis of the two-dimensional test plane 400 corresponds to a plurality of distinct code versions for a given compute service application, and a second axis of the two-dimensional test plane 400 corresponds to a plurality of distinct data versions for the given compute service application.

The two-dimensional test plane 400 is collectively provided by the code versions of the first axis and the data versions of the second axis. More particularly, the two-dimensional test plane 400 in this example comprises an array of points 402 each corresponding to an intersection of a particular one of the code versions and a particular one of the data versions.

The automated testing of step 206 may comprise, for example, traversing a path 404 through at least a portion of the two-dimensional test plane 400. For each of the points on the path 404, a corresponding one of the code versions is tested utilizing a corresponding one of the data versions.

It is to be appreciated that the term "two-dimensional test plane" as used herein is intended to be broadly construed and therefore should not be viewed as being limited to test planes associated with a two-dimensional test space. For example, a two-dimensional test plane in other embodiments can comprise any two dimensions selected from a test space having more than two dimensions. Accordingly, references herein to utilization of two-dimensional test planes in some illustrative embodiments does not preclude the presence of higher dimensional test spaces in those embodiments. One-dimensional test planes referred to herein may similarly be part of higher dimensional test spaces.

Numerous other automated testing arrangements are possible. For example, an alternative path can include a plurality of points for testing a single one of the code versions using respective multiple ones of the data versions. Such an arrangement would correspond to a horizontal path in the context of the FIG. 4 example. Another alternative path can include a plurality of points for testing respective multiple ones of the code versions using a single one of the data versions. Such an arrangement would correspond to a vertical path in the context of the FIG. 4 example. Various other automated test paths can include multiple distinct horizontal or vertical segments for each of which a particular code version or data version is tested using several data versions or several code versions, respectively.

As indicated previously, some embodiments can configure an automated testing system to implement an automated quality assurance software bot that selects the points of the path through at least a portion of the two-dimensional test plane. Such a software bot can be used to determine the particular path 404 in the context of the FIG. 4 example. A given software bot in the FIG. 1 embodiment is illustratively part of the code and data version traversal logic 122 of the automated code testing system 120. Also as noted above, examples of selection techniques that may be applied by the software bot or other instantiation of the code and data version traversal logic 122 include random selection, arbitrary selection, round-robin selection, revenue-based selection and issue-based selection.

Some embodiments are illustratively configured to additionally or alternative perform automated testing in conjunction with a live upgrade or other type of upgrade of at least a portion of an application of a given compute service.

For example, at least a portion of the application of the given compute service may be upgraded from a first code version to a second code version. The first and second code versions in some embodiments represent only a particular designated part of the application in situations in which only that part of the application is being upgraded. Alternatively, the first and second code versions can represent different instances of the entire application in a situation in which the entire application is being upgraded.

In such an arrangement, step 206 can include automatically testing the upgraded application using a selected one of the data versions and its associated set of recorded incoming traffic.

For example, in some embodiments, the automated testing comprises executing the upgraded application utilizing the point-in-time copy of the application data, and in conjunction with executing the upgraded application, replaying the associated set of recorded incoming traffic for processing by the upgraded application. The executing and replaying may be repeated for each of one or more additional data versions and respective associated sets of recorded incoming traffic of the corresponding compute service.

An example of the manner in which point-in-time copies of application data can be stored in association with respective sets of recorded incoming traffic for use in automated code upgrade testing is shown in the illustrative embodiment of FIG. 5.

In this example, a table 500 in a memory or other storage device of a processing platform is configured to store identifiers of application data versions in association with respective sets of recorded incoming traffic. The application data versions more particularly comprise respective point-in-time (PIT) copies of application data. The table 500 comprises a first column 502 that stores the identifiers of the PIT copies and a second column 504 that stores identifiers of the respective sets of recorded incoming traffic.

The table 500 therefore relates each data version for a given application to a corresponding one of the sets of the recorded incoming traffic. For example, the table 500 stores identifiers of different data versions for a first application APP1 including PIT copies denoted T1 and T2 taken at respective different points in time, in association with respective sets of APP1 recorded traffic denoted T1 and T2. Similarly, the table 500 stores identifiers of different data versions for a second application APP2 including PIT copies denoted T3 and T4 taken at respective different points in time, in association with respective sets of APP2 recorded traffic denoted T3 and T4. The table 500 provides similar correspondence between data versions for other applications and corresponding sets of recorded incoming traffic, including for another application APPX a PIT copy denoted TY an association with a corresponding set of APPX recorded traffic TY.

The table 500 in the present example relates the data versions to their respective sets of recorded incoming traffic. In some embodiments, the table 500 stores identifiers and storage locations for the data versions and their respective sets of recorded traffic. The storage locations may be in the form of links or other information providing access to the corresponding data versions or sets of recorded traffic within one or more storage systems. Alternatively, the table 500 can store at least one of the data versions and the sets of recorded traffic, rather than just identifiers and storage locations for such information. For example, the table 500 in some embodiments is itself implemented in a storage system of a processing platform and stores both the data versions and their respective sets of recorded traffic. Numerous alternative arrangements are possible.

In some embodiments, the table 500 is maintained by a copy data manager as part of a data version repository. For example, in the context of the FIG. 1 embodiment, the copy data manager 110 can store the table 500 and its corresponding data versions and associated sets of recorded incoming traffic in the data version repository 112. Alternatively, the sets of recorded incoming traffic can be stored by the traffic capture unit 108 in a separate storage system apart from the data version repository 112.

Storage arrangements other than tables can be used to associate multiple data versions with respective sets of recorded incoming traffic in other embodiments.

It is also possible that multiple code versions may be stored for each of one or more of the compute services. The code versions in some embodiments are obtained from a code version control repository associated with a development platform or other type of code development system. Additionally or alternatively, the code versions can be maintained in a code version repository of a compute services platform or automated code testing system.

Storage of multiple data versions and multiple code versions in some embodiments can be performed concurrently and substantially continuously within a given information processing system.

As indicated previously, some embodiments can configure an automated testing system to implement an automated quality assurance software bot that determines data versions, code versions and sets of recorded incoming traffic for use in live upgrade testing. For example, such a software bot can be configured to utilize table 500 to determine a particular data version and its associated set of recorded incoming traffic in the context of the FIG. 5 example. The software bot in the FIG. 1 embodiment is illustratively part of the code and data version traversal logic 122 of the automated code testing system 120.

Terms such as "automated testing" and "automated code testing system" are intended to be broadly construed so as to encompass a wide variety of arrangements in which code and data versions are selected for use in testing utilizing live upgrade testing logic implemented under processor control.

In some embodiments, the compute services platform is fully integrated with the copy data management functionality of a copy data manager. Accordingly, data transfer capabilities of the copy data manager can be used to move data versions from a data version repository to an automated code testing system. Additionally or alternatively, the automated code testing system can be implemented at least in part within the compute services platform with the platform retrieving code versions of a code version repository for testing with data versions already present in a data version repository of that platform.

Steps 202, 204 and 206 of the FIG. 2 process can be repeatedly iterated as needed, as indicated by the feedback arrow from step 206 to step 202 in the figure.

For example, one or more detected bugs can be repaired and the repaired code version retested using a replay of the recorded incoming traffic until the upgraded application reaches a stable state.

Also, new application data and corresponding incoming traffic can be captured in order to allow code versions to be tested under new conditions. It is also possible to capture application data and corresponding incoming traffic from a given deployment of the application for utilization in automated testing of other deployments of the application.

It is to be appreciated that the FIG. 2 process can be adapted for use with other types of information systems, including by way of example an information processing system in which compute services, copy data management and automated code testing are all implemented on the same processing platform.

The particular processing operations and other system functionality described in conjunction with the flow diagram of FIG. 2 are presented by way of illustrative example only, and should not be construed as limiting the scope of the disclosure in any way. Alternative embodiments can use other types of processing operations involving compute services, copy data management and automated code testing. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different automated test instances within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

It should be understood that the particular information processing system arrangements illustrated in FIGS. 1 through 5 are presented by way of illustrative example only, and should not be construed as limiting in any way. Numerous alternative configurations of system and device elements and associated processing operations can be used in other embodiments.

In these and other embodiments, compute services can be offered to cloud infrastructure tenants or other system users as a PaaS offering, although numerous alternative arrangements are possible.

Illustrative embodiments disclosed herein can provide a number of significant advantages relative to conventional arrangements.

For example, one or more embodiments provide significantly improved detection and analysis of bugs, weaknesses or other types of failures through search algorithm traversal of multiple code and data versions. As a result, application code can be made more robust to failures that might otherwise occur when code versions are executed using data versions that differ from static test data.

In some embodiments, copy data management functionality is integrated with compute services in a processing platform in a manner that facilitates testing of multiple code versions of compute services applications using actual point-in-time backup or replication copies of application data as well as instances of live application data.

Moreover, code version testing in some embodiments is fully automated, possibly utilizing a quality assurance software bot or other code and data version traversal logic to determine an appropriate traversal of a search space.

Also, one or more embodiments provide significantly improved live upgrade functionality for code versions of one or more applications executed as respective compute services in cloud infrastructure.

Live upgrade testing in illustrative embodiments is provided using realistic scenarios corresponding to expected real-world usage of the corresponding applications under a production workload with up-to-date database schema.

In addition, upgrade test time in some embodiments can be significantly reduced through the use of data versions and associated sets of recorded incoming traffic maintained for backup or replication purposes by a copy data manager.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as compute services 106, or portions thereof, are illustratively implemented for use by tenants of such a multi-tenant environment.

As mentioned previously, cloud infrastructure as disclosed herein can include cloud-based systems such as AWS, GCP and Microsoft Azure. Virtual machines provided in such systems can be used to implement at least portions of one or more of a compute services platform, a development platform and an automated code testing system in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of LXC. The containers may run on virtual machines in a multi-tenant environment, although other arrangements are possible. The containers may be utilized to implement a variety of different types of functionality within the system 100. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 6 and 7. Although described in the context of system 100, these platforms may also be used to implement at least portions of other information processing systems in other embodiments.

Figure 6:
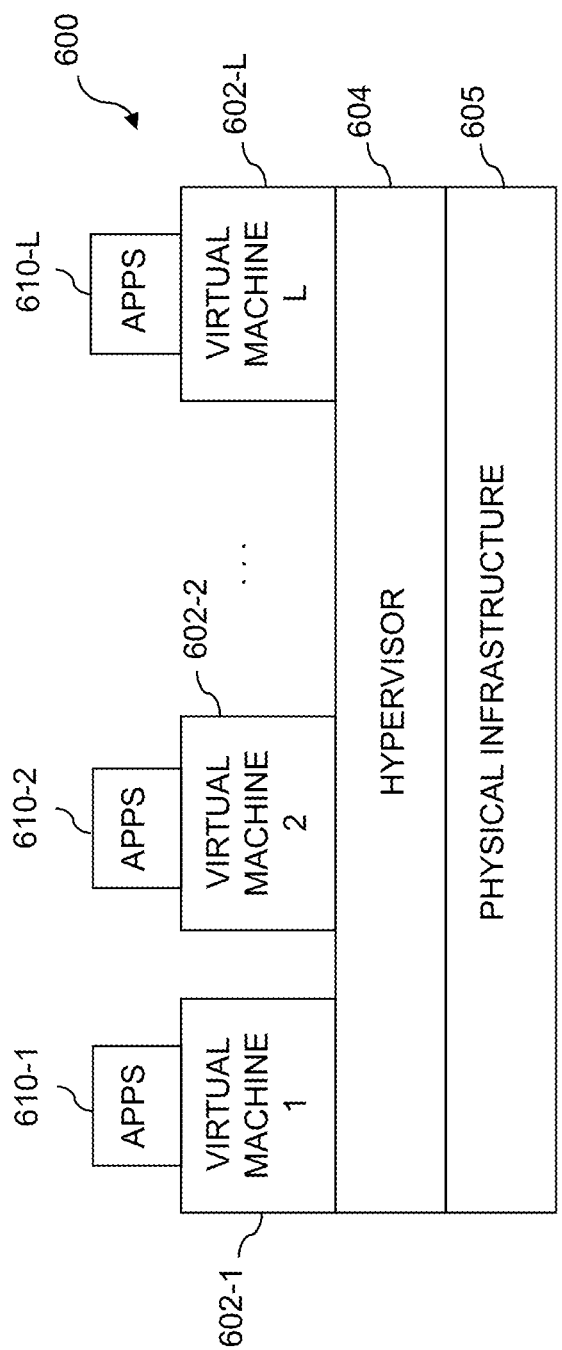
FIGS. 6 and 7 show examples of processing platforms that may be utilized to implement at least a portion of an information processing system in illustrative embodiments of the present disclosure.
Figure 7:
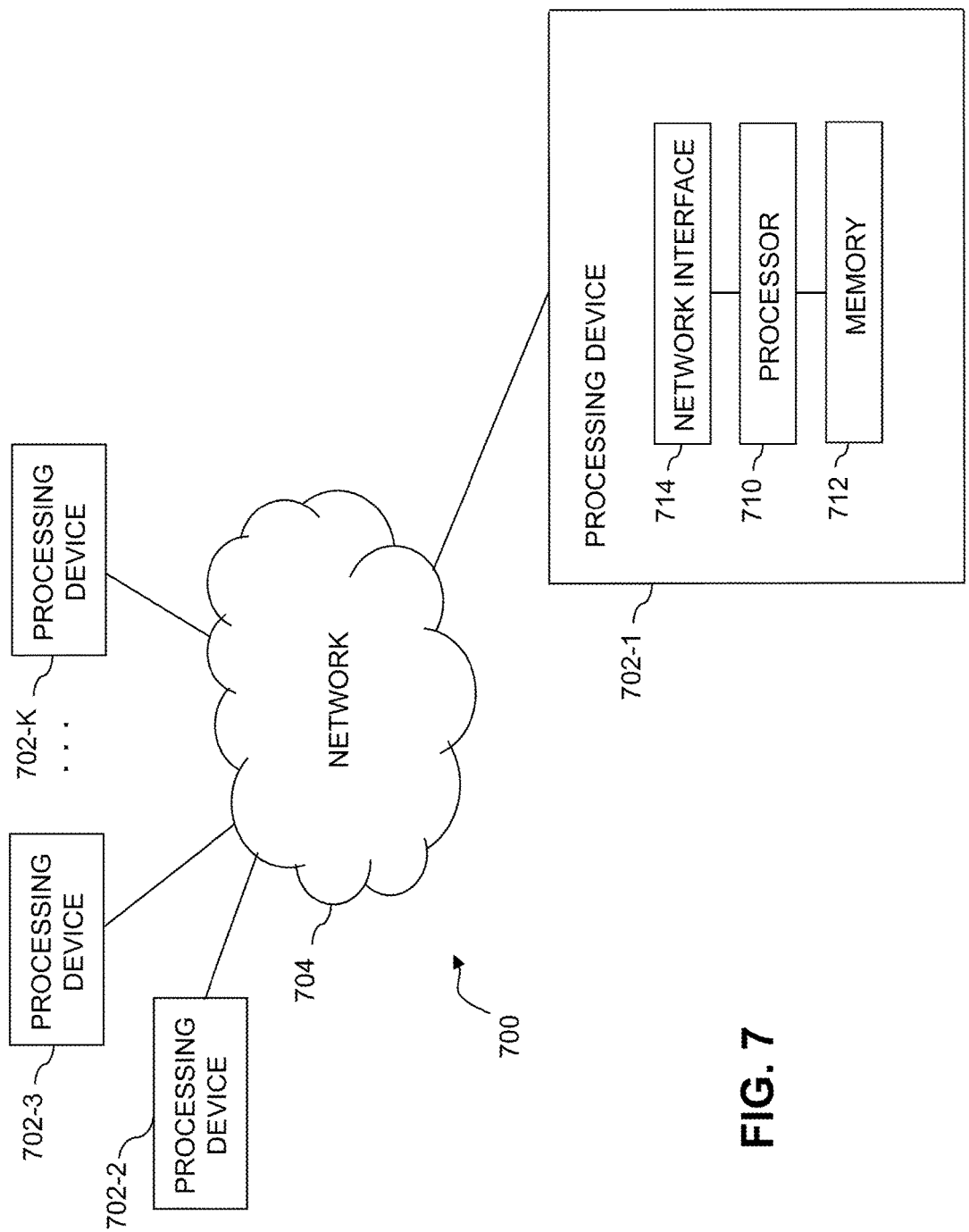

FIG. 6 shows an example processing platform comprising cloud infrastructure 600. The cloud infrastructure 600 comprises a combination of physical and virtual processing resources that may be utilized to implement at least a portion of the information processing system 100. The cloud infrastructure 600 comprises virtual machines (VMs) 602-1, 602-2, . . . 602-L implemented using a hypervisor 604. The hypervisor 604 runs on physical infrastructure 605. The cloud infrastructure 600 further comprises sets of applications 610-1, 610-2, . . . 610-L running on respective ones of the virtual machines 602-1, 602-2, . . . 602-L under the control of the hypervisor 604.

Although only a single hypervisor 604 is shown in the embodiment of FIG. 6, the system 100 may of course include multiple hypervisors each providing a set of virtual machines using at least one underlying physical machine. Different sets of virtual machines provided by one or more hypervisors may be utilized in configuring multiple instances of various components of the system 100.

An example of a commercially available hypervisor platform that may be used to implement hypervisor 604 and possibly other portions of the information processing system 100 in one or more embodiments is the VMware® vSphere® which may have an associated virtual infrastructure management system such as the VMware® vCenter™. The underlying physical machines may comprise one or more distributed processing platforms that include one or more storage systems.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA) or other type of processing circuitry, as well as portions or combinations of such circuitry elements.

The memory 712 may comprise random access memory (RAM), read-only memory (ROM) or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of the functionality of upgrade controller 107, traffic capture unit 108, copy data manager 110, application manager 114, and automated code testing system 120 are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, compute services platforms, upgrade controllers, traffic capture units, copy data managers, application managers, data version and code version repositories, development platforms and automated testing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing platform comprising a plurality of processing devices and implementing compute services for users;
at least one of the processing devices comprising a physical processor coupled to a memory;
said at least one processing platform further comprising:
a copy data manager configured to maintain a data version repository;
wherein the data version repository is configured to store under the control of the copy data manager a plurality of data versions for each of one or more of the compute services implemented by the processing platform;
wherein a code version repository is configured to store a plurality of code versions for each of one or more of the compute services implemented by the processing platform;
the data versions for a given one of the compute services being separate from the code versions for that compute service and comprising respective instances of application data utilized by that compute service;
at least a subset of the data versions for the given compute service being stored in association with respective sets of recorded incoming traffic of the given compute service;
wherein automated testing of multiple ones of the code versions for the given compute service and multiple ones of the data versions for the given compute service is carried out by an automated code testing system applying a search algorithm to traverse both the multiple code versions and the multiple data versions; and
wherein the search algorithm is configured to permit specification of a start code version and a stop code version for an application of the given compute service and a start data version and a stop data version for the application of the given compute service.

2. The apparatus of claim 1 wherein said at least one processing platform comprises at least a first processing platform implementing the compute services and the copy data manager and at least a second processing platform separate from the first processing platform and implementing the automated code testing system.

3. The apparatus of claim 1 wherein the copy data manager is configured to control storage of at least a subset of the data versions for the given one of the compute services in the data version repository as respective point-in-time backup or replication copies of application data utilized by that compute service.

4. The apparatus of claim 1 wherein the copy data manager is configured to control storage of at least a subset of the data versions for the given one of the compute services in the data version repository as respective instances of live application data utilized by that compute service.

5. The apparatus of claim 1 wherein the search algorithm comprises a binary search algorithm comprising at least one of a code version bisection algorithm and a data version bisection algorithm.

6. The apparatus of claim 1 wherein the automated code testing system is configured to automatically determine one or more Boolean result criteria for the search algorithm.

7. The apparatus of claim 1 wherein the automated testing comprises utilizing a plurality of one-dimensional test planes which vary as a function of production time wherein each of the one-dimensional test planes comprises for a corresponding production time at least one point corresponding to a particular one of the code versions and at least one point corresponding to a particular one of the data versions.

8. The apparatus of claim 1 wherein the code versions stored in the code version repository and the data versions stored in the data version repository collectively provide a two-dimensional test plane and further wherein the automated testing comprises testing at least one of the code versions using multiple distinct ones of the data versions selected from the two-dimensional test plane.

9. The apparatus of claim 8 wherein the automated testing comprises traversing a path through at least a portion of the two-dimensional test plane and for each of a plurality of points in the path testing a corresponding one of the code versions utilizing a corresponding one of the data versions.

10. The apparatus of claim 1 wherein the set of recorded incoming traffic stored in association with one of the data versions characterizes a traffic workload processed by an application of the given compute service.

11. The apparatus of claim 1 wherein in conjunction with an upgrade of at least a portion of the application from a first code version to a second code version, automated testing of the upgraded application is carried out by the automated code testing system using a given data version and its associated set of recorded incoming traffic.

12. The apparatus of claim 1 wherein the copy data manager is configured to transfer the data versions utilized in the automated testing from the data version repository to the automated testing system.

13. The apparatus of claim 1 wherein the code version repository comprises a code version control repository associated with a code development system and wherein the automated testing system is configured to retrieve the code versions from the code version repository.

14. The apparatus of claim 1 wherein the search algorithm is selected from a plurality of available search algorithms based at least in part on a progression type of the code versions and the data versions.

15. A method comprising:
implementing compute services for users;
storing a plurality of data versions for each of one or more of the compute services;
storing a plurality of code versions for each of one or more of the compute services;
the data versions for a given one of the compute services being separate from the code versions for that compute service and comprising respective instances of application data utilized by that compute service;
at least a subset of the data versions for the given compute service being stored in association with respective sets of recorded incoming traffic of the given compute service; and
automatically testing multiple ones of the code versions for the given the compute service and multiple ones of the data versions for the given compute service by applying a search algorithm to traverse both the multiple code versions and the multiple data versions;
wherein the search algorithm is configured to permit specification of a start code version and a stop code version for an application of the given compute service and a start data version and a stop data version for the application of the given compute service; and
wherein the method is performed by at least one processing platform comprising a plurality of processing devices.

16. The method of claim 15 wherein the search algorithm comprises a binary search algorithm comprising at least one of a code version bisection algorithm and a data version bisection algorithm.

17. The method of claim 15 wherein the search algorithm is selected from a plurality of available search algorithms based at least in part on a progression type of the code versions and the data versions.

18. A computer program product comprising a non-transitory processor-readable storage medium having stored therein program code of one or more software programs, wherein the program code when executed by at least one processing platform causes said at least one processing platform:
to implement compute services for users;
to store a plurality of data versions for each of one or more of the compute services;
to store a plurality of code versions for each of one or more of the compute services;
the data versions for a given one of the compute services being separate from the code versions for that compute service and comprising respective instances of application data utilized by that compute service;
at least a subset of the data versions for the given compute service being stored in association with respective sets of recorded incoming traffic of the given compute service; and
to automatically test multiple ones of the code versions for the given compute service and multiple ones of the data versions for the given compute service by applying a search algorithm to traverse both the multiple code versions and the multiple data versions;
wherein the search algorithm is configured to permit specification of a start code version and a stop code version for an application of the given compute service and a start data version and a stop data version for the application of the given compute service.

19. The computer program product of claim 18 wherein the search algorithm comprises a binary search algorithm comprising at least one of a code version bisection algorithm and a data version bisection algorithm.

20. The computer program product of claim 18 wherein the search algorithm is selected from a plurality of available search algorithms based at least in part on a progression type of the code versions and the data versions.

* * * * *